(12) United States Patent
Olker et al.

(10) Patent No.: US 7,143,097 B1
(45) Date of Patent: Nov. 28, 2006

(54) METHOD AND APPARATUS FOR MIGRATING FILE LOCKS FROM ONE SERVER TO ANOTHER

(75) Inventors: David F. Olker, Rocklin, CA (US); Stacey Lee, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 468 days.

(21) Appl. No.: 10/632,233

(22) Filed: Jul. 30, 2003

(51) Int. Cl.
*G06F 17/30* (2006.01)

(52) U.S. Cl. ......................................... 707/10

(58) Field of Classification Search ............... 707/1–10, 707/100–104.1, 200–206; 709/201, 203, 709/207, 214, 219, 227, 236, 228; 719/330; 715/765, 764

See application file for complete search history.

(56) References Cited

U.S. PATENT DOCUMENTS

| | | | |
|---|---|---|---|
| 6,434,628 B1 * | 8/2002 | Bowman-Amuah | 714/48 |
| 6,496,850 B1 * | 12/2002 | Bowman-Amuah | 709/203 |
| 2004/0133652 A1 * | 7/2004 | Miloushev et al. | 709/214 |

* cited by examiner

*Primary Examiner*—Diane D. Mizhahi

(57) ABSTRACT

Using migratory network file system topologies, client file locks are managed by a file lock manager on a primary server. A network file system tracks all client file locks on the primary server. New file locks are identified and retained to support future migration of network file system service to an adoptive server. When a migration of network file system services is needed, the retained file locks are conveyed to the adoptive server. The adoptive server is forced to recognize the conveyed file locks.

48 Claims, 8 Drawing Sheets

METHOD AND APPARATUS FOR MIGRATING FILE LOCKS FROM ONE SERVER TO ANOTHER

BACKGROUND

Increasing demand for network services has led to many innovative techniques whereby multiple servers are clustered together in order to provide higher capacity and/or higher server availability. A cluster of servers can now masquerade as a single server from the perspective of a client system. Hence, as one client system accesses the cluster, it perceives only a single server and interacts with that server in a classic client-server relationship.

One of the services that a client depends on is that of access to remotely mounted volumes of data storage. One manner in which a single server provides this type of access is through a facility known as a network file system (NFS). An NFS facility allows a client to mount a volume of data storage and then access files on the mounted volume as though those files were local to the client. Since an NFS must be capable of supporting a plurality of client requests, a volume of data storage may be mounted by several clients. Hence, individual clients must contend for a remotely mounted volume provided by the NFS. One example NFS structure manages individual client requests for data at a file level. According to one example of an NFS system, a client requests access to a file. This is accomplished by interacting with a file lock manager, typically integral to the NFS system. Once the file lock manager grants access to a particular client, a file lock status manager (a process that monitors the activity of the lock manager) notes the existence of an active client file lock. One manner in which the lock status manager notes the existence of an active client file lock, according to one example NFS structure, is by creating a client file lock description file and placing the client file lock description file into a status directory.

This method for sharing files through file locks works well so long as the server providing the NFS functionality is truly a single server and not a server cluster as previously described. In the case where a server cluster is providing NFS functionality, the NFS functionality may migrate from one server platform to another based on availability of processing resources. Hence, where a client receives a file lock from an NFS's lock manager operating on one server in the cluster, that same file lock may not be recognized by an NFS lock manager operating on a different server in the cluster. This condition is problematic; especially when the client begins to interact with a different server in the cluster because the primary server can no longer provide NFS functionality to that client (i.e. the service function has migrated to a different server). This different server is normally referred to as an "adoptive" server.

The problem is somewhat exacerbated by the fact that the client remains blissfully unaware that it is now interacting with a different server platform within the server cluster. Hence, the client may attempt to access a file on a remotely mounted volume using what it perceives to be a valid client file lock. The NFS lock manager operating on the adoptive server will not honor a file access request from the client because it is not privy to the client file lock granted by the lock manager operating on the first (i.e. primary) server.

SUMMARY

A method for migrating file locks from one server to another comprising receiving a file lock indicator from a primary server. The file lock indicator is conveyed to an adoptive server when the primary server is not available.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
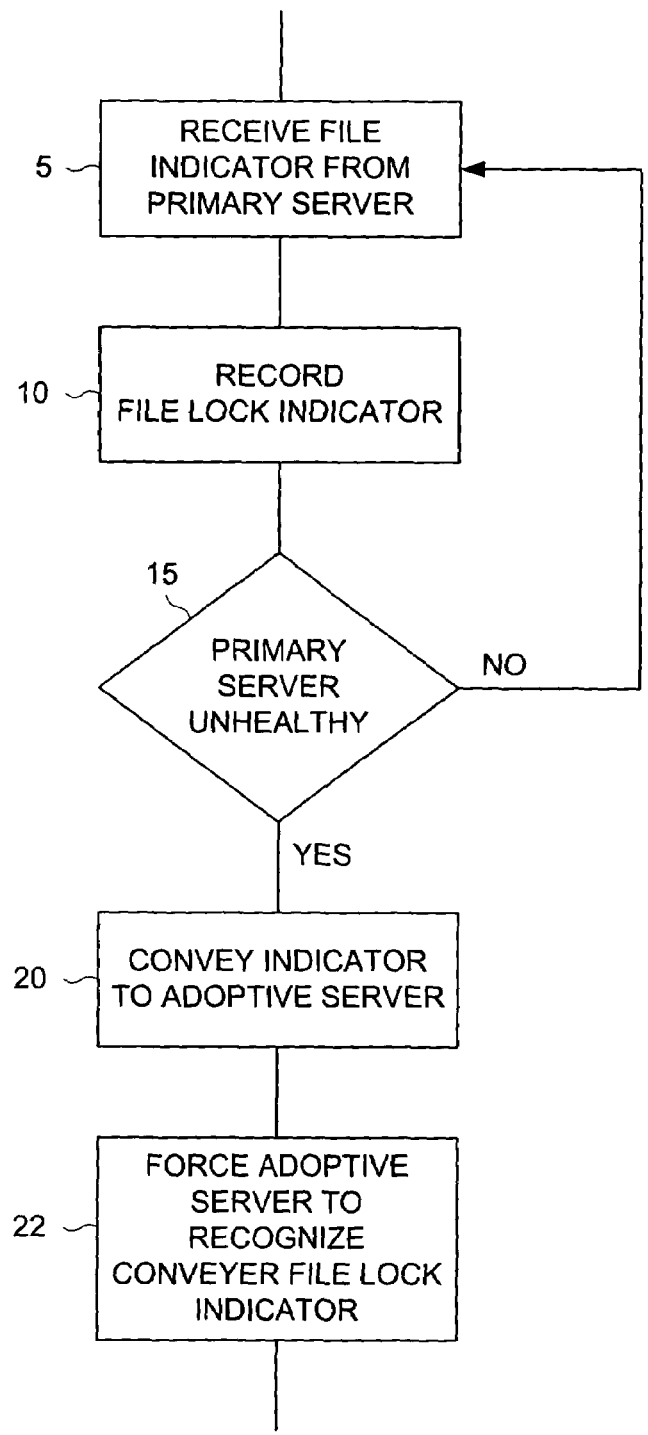
FIG. 1 is a flow diagram that depicts one exemplary method for migrating file locks from one server to another.

FIG. 1 is a flow diagram that depicts one exemplary method for migrating file locks from one server to another. According to this example method, a file lock indicator is received from a primary server (step 5). According to one alternative variation of the present method, a file lock indicator is received from a primary server in the form of a simple indicator (e.g. a message or a signal). A notation is made reflecting the fact that the file lock indicator was received from the primary server, e.g. by recording the file lock indicator (step 10). This example method further comprises the conveyance of the file lock indicator to an adoptive server (step 20) when the primary server is unhealthy (step 15).

Figure 1A:
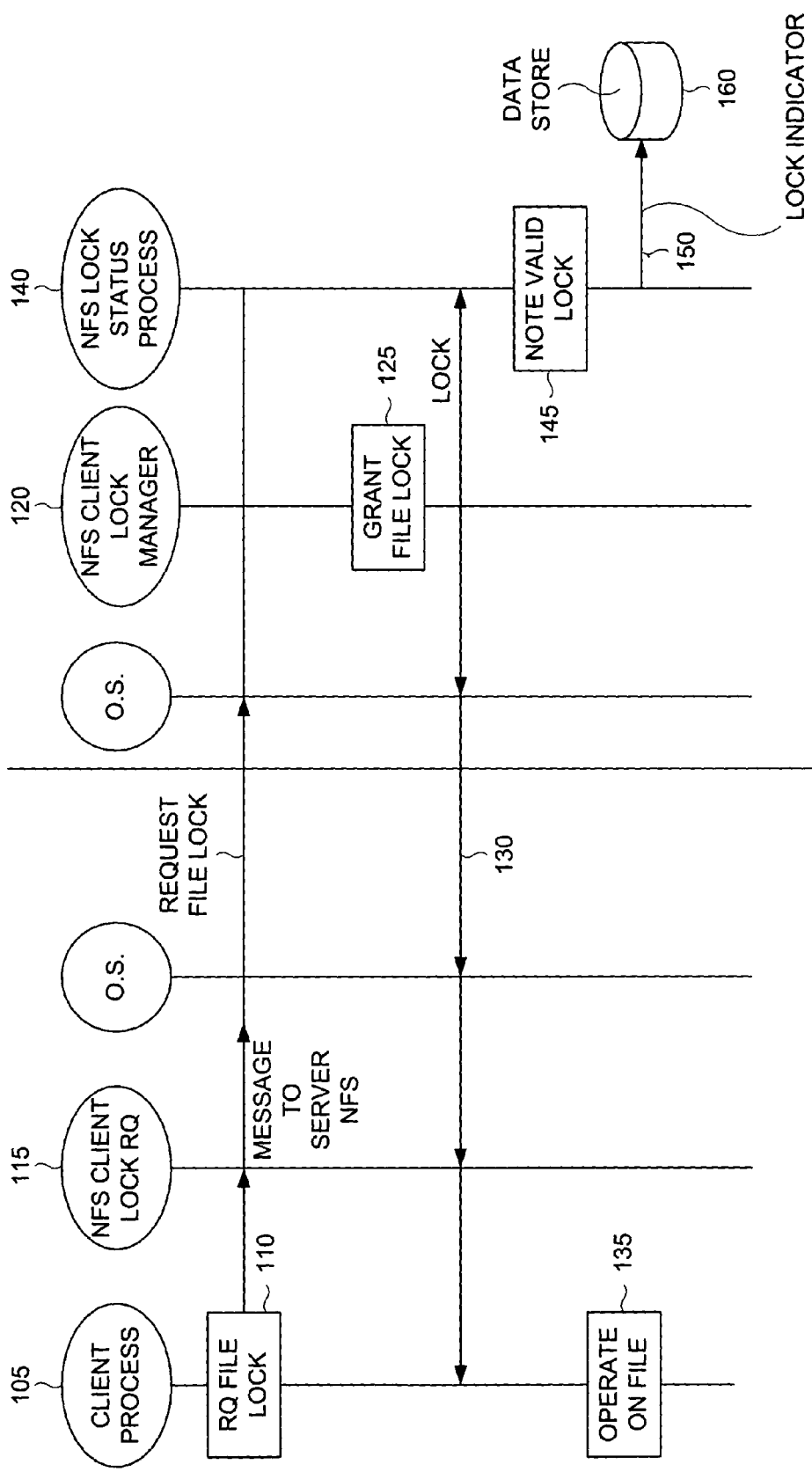
FIG. 1A is message diagram that depicts one example method by which a client process requests and receives a file lock from a network file system.

FIG. 1A is message diagram that depicts one example method by which a client process requests and receives a file lock from a network file system. Generally, the present method is applied in conjunction with a network file system (NFS) that operates on a primary server. As the NFS operates, it will grant access to a file to a particular client. The NFS then creates a file lock indicator. According to one embodiment of an NFS system, the file lock indicator comprises information pertaining to the file lock, the client to whom the file lock was granted and associated file access privileges.

FIG. 1A further illustrates that a client process 105 issues a request for a file lock (step 110). In so doing, the client process 105 interacts with a client-side NFS file lock request process 115. The client file lock request process 115 local to the client interacts with a corresponding client file lock manager 120 executing within the server. According to one example embodiment of an NFS, the lock manager comprises a specific process known as the rpc.lockd daemon. In the case that the server-side client file lock manager 120 grants a file lock (step 125), a file lock 130 is propagated back to the client process 105. Once the client process 105 receives the file lock 130, it may then operate on the file (step 135).

The NFS server-side lock manager 120 also interacts with a server-side lock status process 140. The lock status process 140 makes a notation (step 145) of the file lock once the file lock is dispatched to the client process 105 that originally requested the file lock. According to one example embodiment of an NFS system, this notation is made by means of a file lock indicator 150 that is stored in a file lock data store 160. According to yet another example embodiment of an NFS system, the server-side lock status process 140 comprises a specific process known as the rpc.statd daemon. According to one alternative example of an NFS system, the file lock indicator is stored in a predetermined data-store as a client file lock description file. For example, according to one example embodiment, such a client file lock description file is stored in a directory called /var/statmon/sm, which is merely one example of a network file system status monitor directory. It should be noted that the present method and the scope of the claims appended hereto is not intended to be limited to any particular directory that may be used by a particular embodiment of a network file system. Hence, the scope of the appended claims is intended to be read in the context of a predetermined data-store that is capable of storing a file lock indicator representative of a file lock granted by a lock manager 120 to a requesting client process 105.

Figure 2:
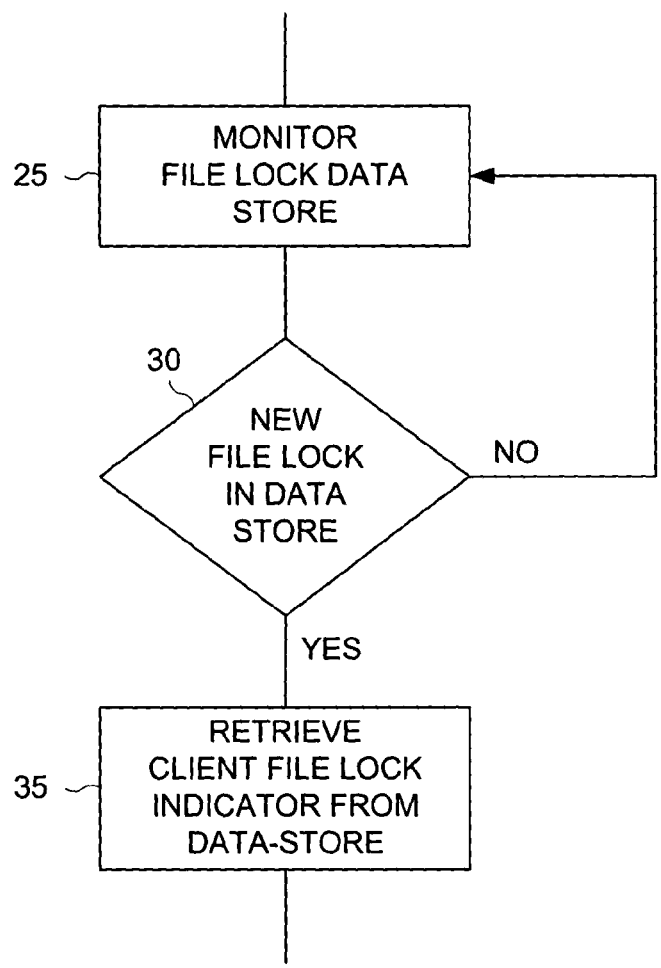
FIG. 2 is a flow diagram that depicts one example method for receiving a file lock indicator.

FIG. 2 is a flow diagram that depicts one example method for receiving a file lock indicator. According to this example method, a file lock indicator is received by monitoring a file lock data-store (step 25). In the event that a new file lock indicator is found in the monitored data-store (step 30), the new file lock indicator is retrieved from the data-store (step 35). It should be noted that the data-store monitored and used as the source of a file lock indicator by this process, according to one alternative method, comprises a network file system status monitor directory (e.g./var/statmon/sm). Again, the scope of the appended claims is not intended to be limited to any particular type of data-store. According to one alternative of the present method, a file lock indicator is received as a message or as a signal from a primary server (e.g. by means of a network message).

Figure 3:
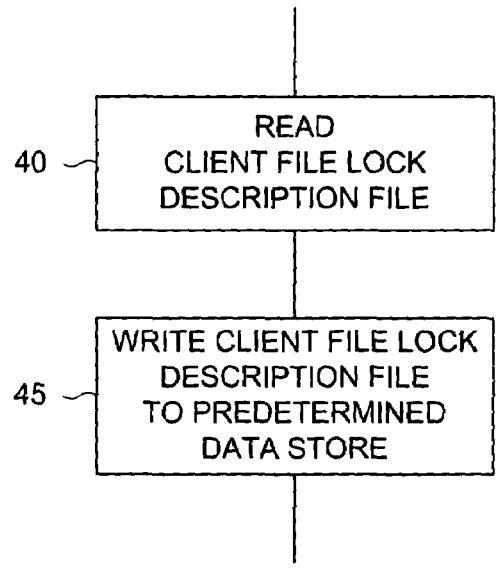
FIG. 3 is a flow diagram that depicts one example method for recording a file lock indicator.

FIG. 3 is a flow diagram that depicts one example method for recording a file lock indicator. According to this example method, a client file lock description file is copied to a predetermined data-store. According to one variation of the present method, this is accomplished by reading a client file lock description file (step 40) and then writing the description file to a predetermined data-store (step 45). According to yet another variation of this example method, the client file lock description file is read from a network file system status monitor directory as discussed above (e.g. Ivar/statmon/sm).

Figure 4:
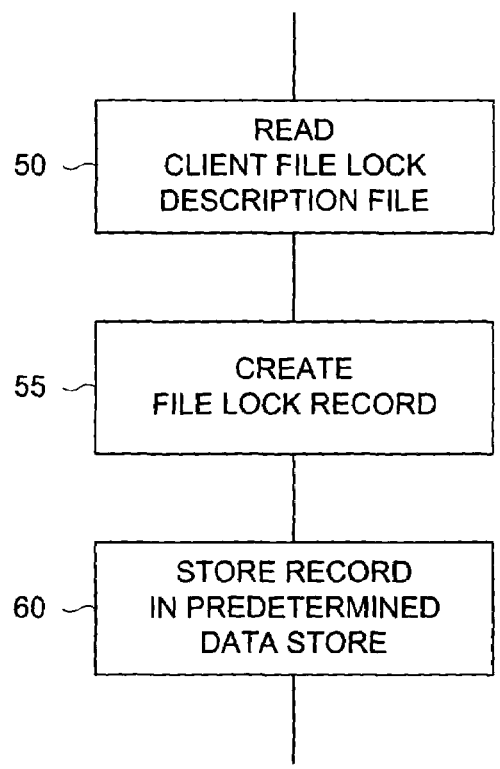
FIG. 4 is a flow diagram that depicts one alternative example method for recording a file lock indicator.

FIG. 4 is a flow diagram that depicts one alternative example method for recording a file lock indicator. According to this alternative method, a file lock record is created according to a client file lock description file. According to one variation of this alternative method, this is accomplished by reading a client file lock description file (step 50), creating a file lock record according to the description file (step 55) and storing the record in a predetermined data-store (step 60). According to yet another variation of this example method, the client file lock description file is read from a network file system status monitor directory as discussed above. The record, according to one variation of the present method, is stored through the use of a database management process (e.g. a structured query language server process).

Figure 5:
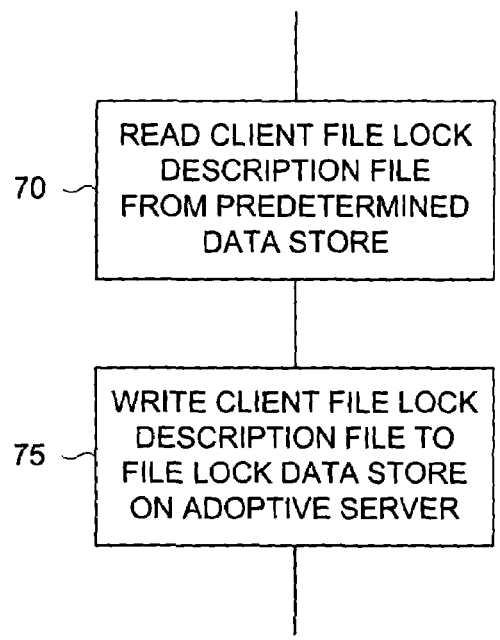
FIG. 5 is a flow diagram that depicts one example method for conveying a file lock indicator to an adoptive server.

FIG. 5 is a flow diagram that depicts one example method for conveying a file lock indicator to an adoptive server. According to this example method, conveying a file lock indicator to an adoptive server is accomplished by placing a client file lock indicator in a file lock data-store on the adoptive server. According to one alternative variation of this method, this is accomplished by reading a client file lock description file from a predetermined data-store (step 70) and then writing the client file lock description file to a file lock data-store on the adoptive server (step 75). According to yet another variation of this example method, the client file lock description file is written to a network file system status monitor directory (e.g. Ivar/statmon/sm) on the adoptive server.

Figure 6:
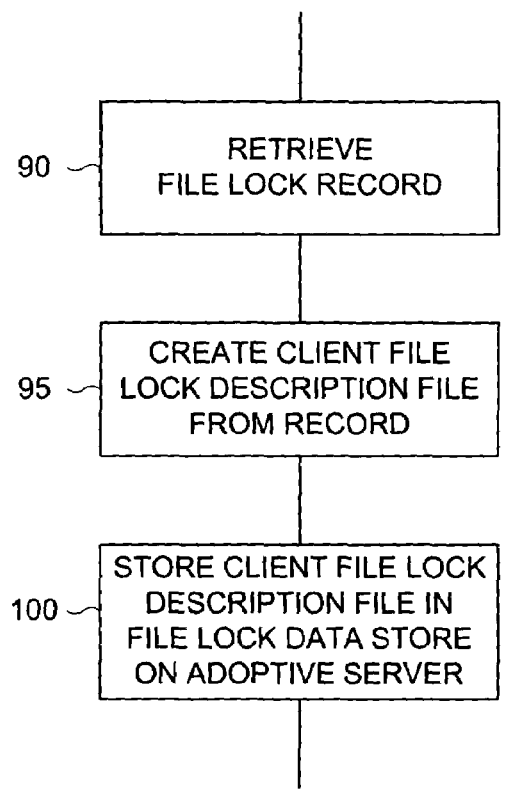
FIG. 6 is a flow diagram that depicts one alternative example method for conveying a file lock indicator to an adoptive server.

FIG. 6 is a flow diagram that depicts one alternative example method for conveying a file lock indicator to an adoptive server. According to this alternative example method, a file lock indicator is conveyed to an adoptive server by retrieving a file lock record (step 90) and creating a client file lock description file (step 95) according to information stored in the retrieved file lock record. The newly created client file lock description file is then stored in a file lock data-store on the adoptive server (step 100). The record, according to one variation of the present method, is retrieved through the use of a database management process (e.g. a structured query language server process).

FIG. 1 further illustrates that one example method further comprises a step for forcing the adoptive server to recognize the file lock (step 22) that was conveyed to it (i.e. the migrated file lock). According to one variation of the present method, this is accomplished by at least one of the following methods: restarting a network file system executing on the adoptive server; restarting a network file system file lock manager and its associated status manager executing on the adoptive server; and triggering the network file system executing on the adoptive server to perform a file lock recovery sequence. In each of these illustrative methods for forcing the adoptive server to recognize a migrated file lock, the network file system will interact with a client process providing the client process that was granted a file lock to reclaim the file lock during a file lock recover sequence. Note that restarting the network file system and restarting the network file system file lock manager and its associated status manager both result in an implicit file lock recovery sequence according to one example embodiment of a network file system.

Figure 7:
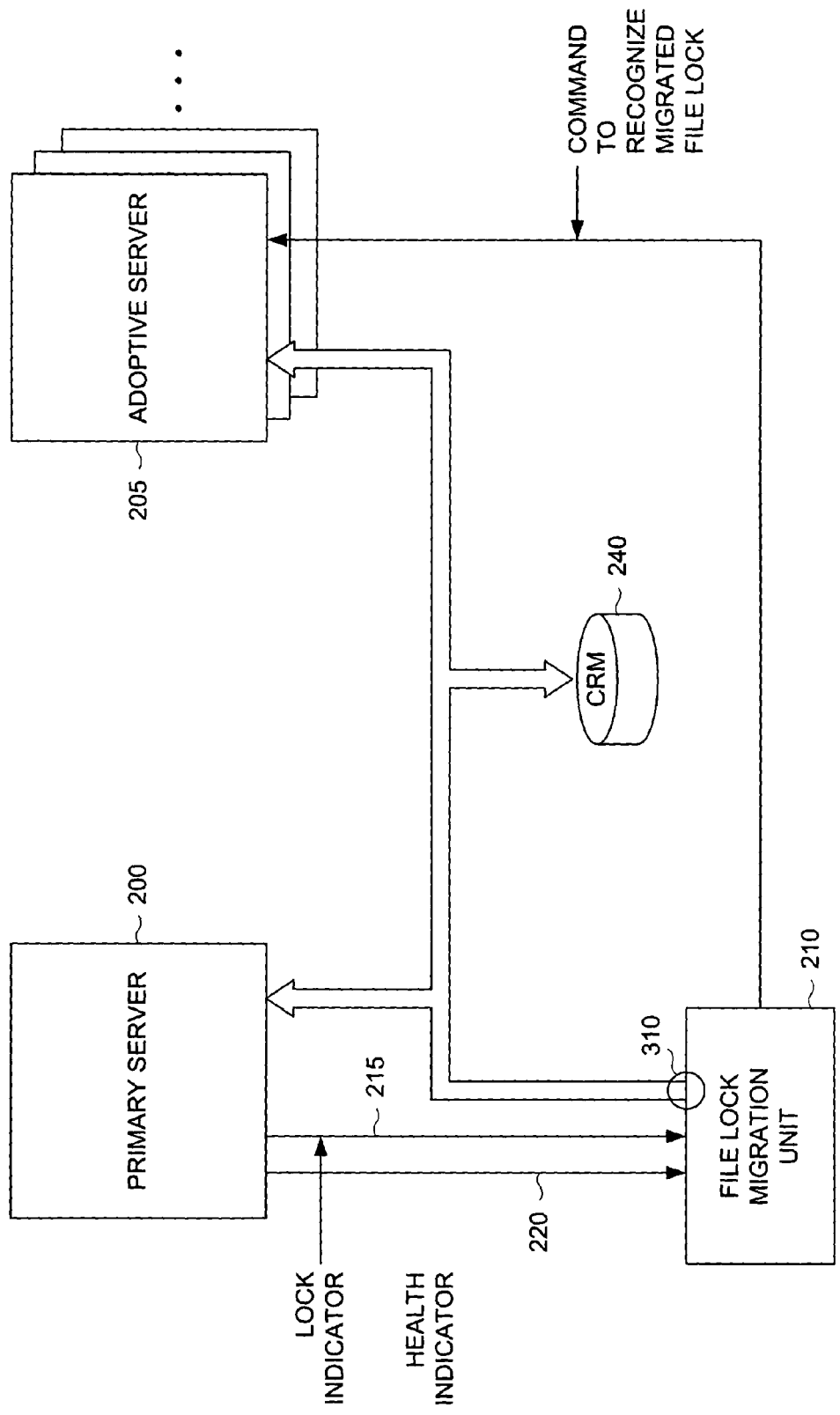
FIG. 7 is a block diagram that depicts one example installation of a file lock migration unit in a cluster of servers.

FIG. 7 is a block diagram that depicts one example installation of a file lock migration unit in a cluster of servers. A cluster of servers, as already defined, comprises a plurality of servers wherein one server is a primary server 200 and other servers that are ready to take over a migrated NFS function. One of these other servers is known as an adoptive server 205 when it actually accepts a migrated NFS function. According to this example embodiment, a file lock migration unit 210 is installed in a manner whereby it is capable of receiving a lock indicator 215 from the primary server 200. The file lock migration unit 210 is also capable of receiving a health indicator 220. This health indicator 220 is typically received from the primary server 200. However, the scope of the appended claims is not intended to be limited to embodiments of a file lock migration unit that receive a health indicator only from a primary server 200. A health indicator 220, according to one alternative embodiment, is received from other monitoring equipment not necessarily shown in the figure. For example, the health indicator may be received from an ancillary piece of equipment, the function of which is to monitor the health of the primary server 200. According to this illustrative installation scenario, the file lock migration unit 210 is also capable of connecting to computer readable medium (CRM) 240. It should be noted that the computer readable medium 240 is typically utilized by the primary server 200 and other servers, including the adoptive server 205, for storage of data. Accordingly, the computer readable medium 240, according to one illustrative installation scenario, is partitioned to provide addressable volumes that may be accessed by any server attached to the computer readable medium 240. Likewise, the computer readable medium 240 and any partitioned volume thereof is accessible to the file lock migration unit 210 according to this installation scenario.

Figure 8:
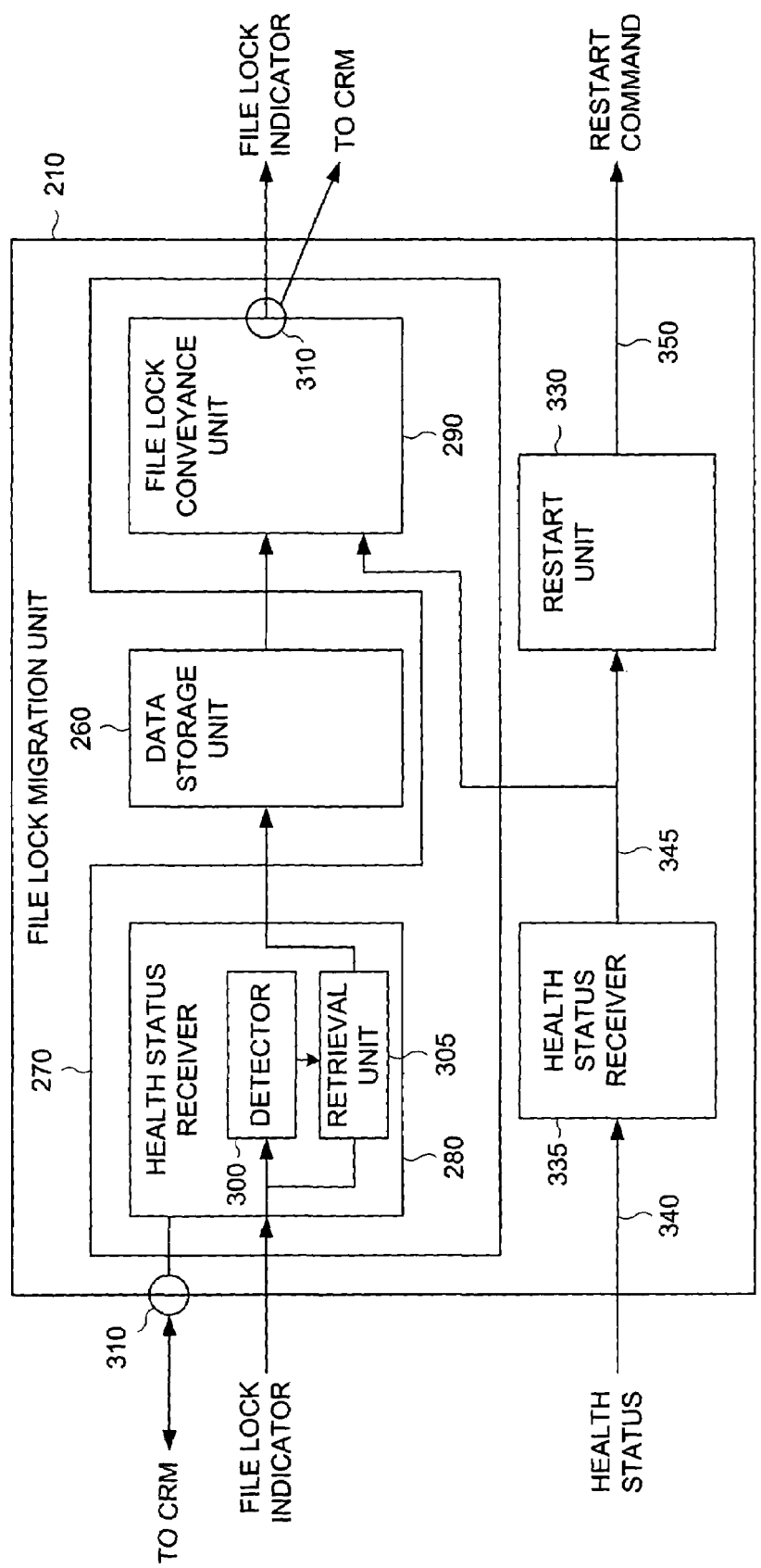
FIG. 8 is a block diagram that depicts one illustrative embodiment of a file lock migration unit.

FIG. 8 is a block diagram that depicts one illustrative embodiment of a file lock migration unit. According to this illustrative embodiment, a file lock migration unit 210 comprises a data storage unit 260 and a file lock monitor 270. The file lock monitor comprises a file lock receiver 280 and a file lock conveyance unit 290. According to this example embodiment, the file lock receiver is capable of receiving a file lock indicator from the primary server 200 and storing the file lock indicator into the data storage unit 260. The file lock conveyance unit 290 is capable of conveying a file lock indicator stored in the data storage unit 260 to the adoptive server 205 when NFS functional duties are migrated to the adoptive server (i.e. the primary server is unhealthy).

According to one alternative example embodiment, the file lock receiver comprises a detector 300 and a retrieval unit 305. The detector 300 is capable of monitoring a file lock data-store on the primary server. Accordingly, the file lock receiver 280 further comprises a data-store interface 310 for accessing a file lock data-store on the primary server. According to one example alternative embodiment, the data-store interface 310 comprises an interface to computer readable medium, e.g. a small computer systems interface (SCSI) or an integrated drive electronics (IDE) interface. The scope of the appended claims is not intended to be limited to any particular type of data-store interface presented here for illustrative purposes.

According to this example embodiment, the detector 300 monitors the file lock data-store on the computer readable medium 240; for example on a partitioned volume managed by the primary server 200. Hence, a partition on the computer readable medium 240 that is managed by the primary server 200 comprises a data-store that serves the primary server 200. This partition is also said to be on the primary server 200. Accordingly, the data-store interface 310 is also connected to the computer readable medium 240 enabling the file lock receiver 280 and the detector 300 therein to access a file lock data-store that is on the primary server 200. When the detector 300 identifies a new client file lock indicator (e.g. a client file lock description file) in the file lock data-store that serves the primary server 200, it commands the retrieval unit 305 to fetch the new client file lock indicator from the file lock data-store serving the primary server.

According to one alternative embodiment, the detector 300 monitors a network file system status monitor directory on the data-store serving the primary server 200 (e.g. Ivar/statmon/sm). Again, the data-store may be embodied in various forms and the scope of the appended claims is not intended to be limited to any particular embodiment wherein a computer readable medium is partitioned into volumes wherein one of said volumes is managed by the primary server 200. The data-store, according to other example embodiments, includes, but is not limited to random access memory and rotating magnetic media.

According to one alternative embodiment, the retrieval unit 305 also uses the data-store interface 310 to retrieve a file lock indicator. According to one example alternative embodiment, the retrieval unit 305 copies a client file lock description file from the data-storage unit serving the primary server 200 and stores this in the data storage unit 260. According to yet another alternative illustrative embodiment, the retrieval unit 305 reads a client file lock description file from the data storage unit serving the primary server 200 and generates a file lock record according to the client file lock description file. This file lock record is stored in the data storage unit 260.

According to one illustrative embodiment, the file lock conveyance unit 290 is capable of placing a client file lock indicator in a file lock data-store on an adoptive server 205. According to one example installation scenario, as depicted in FIG. 7, the adoptive server 205 is attached to the computer readable medium 240 by means of a shared bus connection (e.g. a SCSI interface). A partition of the computer readable medium 240 is managed by the adoptive server 205 and that partition is said to serve the adoptive server 205 (i.e. it is on the adoptive server 205). Hence, the file lock conveyance unit 290 of this illustrative embodiment is capable of writing data onto the data-store that serves, or is on the adoptive server 205 by way of a data-store interface 310. This data-store interface 310, according to one embodiment, is the same data-store interface 310 comprising the file lock receiver 270.

FIG. 8 further illustrates that one alternative embodiment of a file lock migration unit further comprises a restart unit 330. According to one example embodiment, the restart unit 330 is capable of forcing the adoptive server 205 to recognize a file lock indicator that was conveyed thereto by the file lock conveyance unit 290. According to one alternative embodiment, the restart unit 330 is capable of sending at least one of the following commands: a network file system restart command; a network file system lock management and lock status restart command; and a network file system file lock recovery sequence trigger command. In each of these instances, the NFS executing on the adoptive server 205 will orchestrate a crash recovery sequence wherein a file lock indicator that is present in the file lock data-store on the adoptive server 205 will be used as a basis for reestablishing a file lock with a particular client process.

FIG. 8 further illustrates that one alternative embodiment of a file lock migration unit further comprises a health status receiver 335. According to this example embodiment, the health status receiver 335 receives health status information 340 that reflects the health of the primary server 200. A migration signal 345 is generated by the health status receiver 335 when the health status signal 340 indicates that the primary server 200 is unhealthy. This migration signal 345 causes the file lock conveyance unit 290 to convey a file lock indicator stored in the data storage unit 260 to the adoptive server 205. Once the file lock conveyance unit 290 has accomplished its task, the restart unit 330 dispatches one of the various restart commands 350 heretofore described. It should be noted that the scope of the appended claims is not intended to be limited to this enumeration of commands presented here for illustrative purposes. The scope of the appended claims is to include the dispatch of any command that results in the recognition of a migrated file lock by the network file system executing on the adoptive server.

Figure 9:
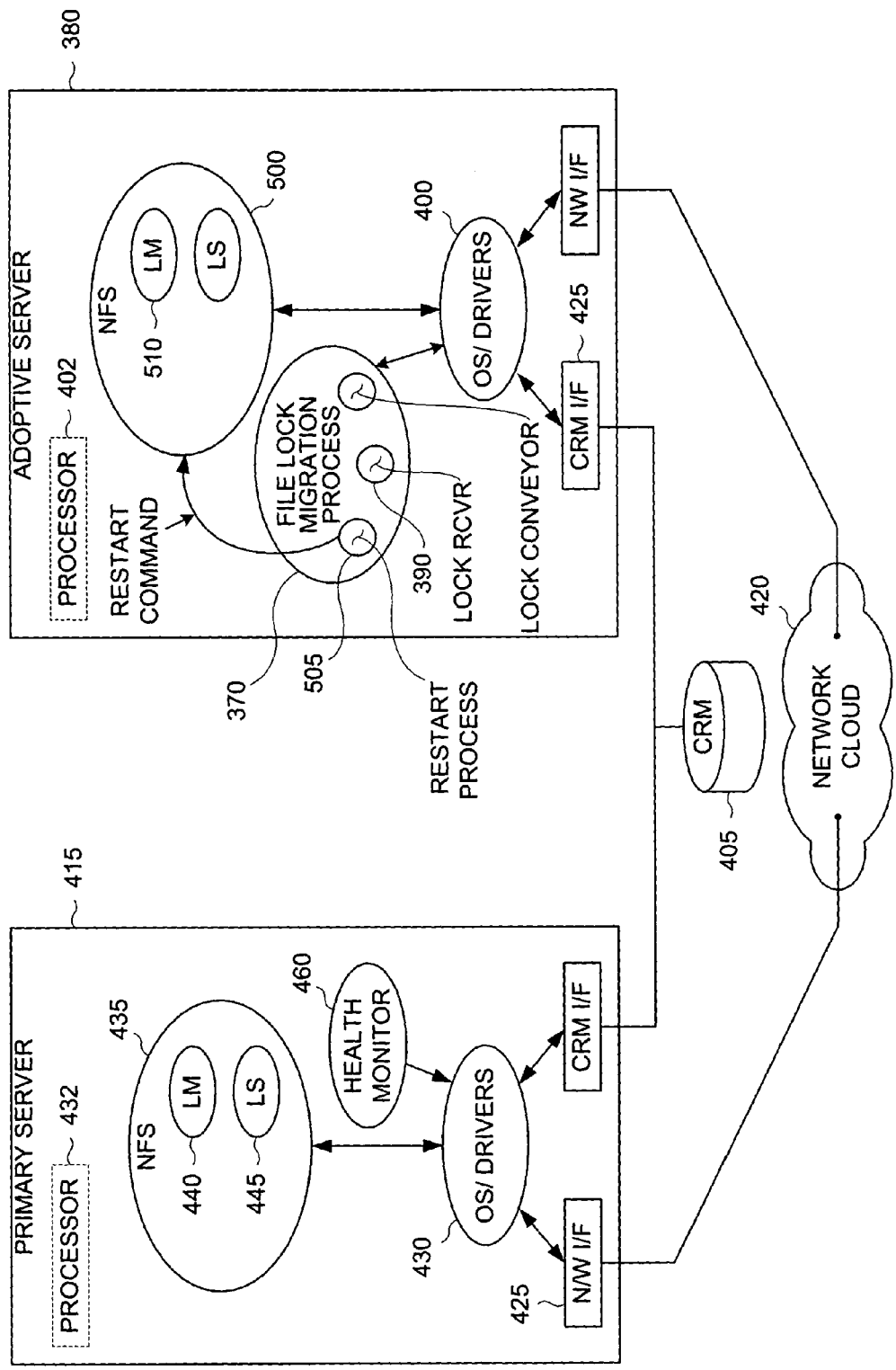
FIG. 9 is a data flow diagram that depicts the operation of a system based embodiment of a file lock migration unit.

FIG. 9 is a data flow diagram that depicts the operation of a system based embodiment of a file lock migration unit. According to one example embodiment, a file lock migration unit comprises a processor (402 or 432) and various functional modules each of which comprises an instruction sequence. For purposes of this disclosure, a functional module and its corresponding instruction sequence is referred to by a process name. Accordingly, this example embodiment comprises a file lock migration process 370. The file lock migration process 370 is executed by a processor (e.g. a processor in an adoptive server 380 comprising one or more processors). One of the functions performed by the processor when it executes the file lock migration process 370 is to receive a file lock indicator from a primary server. Yet another function performed by the processor when it executes the file lock migration process 370 is to record the file lock indicator in a first predetermined data-store. Yet another function performed by the processor when it executes the file lock migration process 370 is to convey the file lock indicator to a second predetermined data-store when the primary server 415 is unhealthy.

This minimal set of functions does not preclude the file lock migration process 370 from causing the processor to perform other functions according to various alternative embodiments of said file lock migration process 370. Hence, the reader is advised that the term "minimally causes the processor" and variants thereof is intended to server as an open-ended enumeration of functions performed by the processor as it executes a particular functional process (i.e. instruction sequence). As such, an embodiment where a particular functional process causes the processor to perform functions in addition to those defined in the appended claims is to be included in the scope of the claims appended hereto.

According to one example embodiment, a computer readable medium 405 is partitioned so as to provide a partition to a primary server 415. As the system operates, a client request for a file lock is typically received from a network 420. This request for a client file lock is received by means of a network interface 425 comprising the primary server 415. Operating system drivers 430 control the network interface 425 enabling the primary server 415 to receive the client file lock request and propagate it to a network file system 435 executing on the primary server 415. The network file system 435 comprises a lock manager 440 that processes the request for a client file lock. When a client file lock is granted to a particular client, a lock status process 445 comprising the network file system 435 executing on the primary server 415 places a file lock indicator in the data-store residing on the computer readable medium 405 (e.g. on a partition managed by the primary server 415 and its operating system/drivers 430).

According to one example alternative embodiment of a file lock receiver process 390, the file lock receiver process 390 accesses the data-store on the primary server 415 (i.e. the partition of the computer readable medium 405 managed by the primary server 415) through the use of operating system drivers 400 so as to communicate with the computer readable medium 405. The operating system and its drivers 400 control a computer readable medium interface 410 by which the file lock receiver process 390 is able to access the data-store in which the primary server 415 placed a file lock indicator.

According to one alternative embodiment of a file lock migration process 370, the file lock migration process 370 (i.e. the file lock migration process instruction sequence) comprises a file lock receiver process 390. The file lock receiver process 390, when executed by the processor, minimally causes the processor to monitor a file lock data-store on the primary server 415 and retrieve a client file lock indicator when a new client file lock indicator is detected in the file lock data-store on the primary server 415. According to one alternative embodiment, the file lock receiver process 390 minimally causes the processor to monitor a file lock data store on the primary server 415 by causing the processor to monitor a network file system status monitor directory (e.g. /var/statmon/sm).

According to yet another example embodiment, the file migration process (i.e. instruction sequence) 370 minimally causes the processor to record a file lock indicator by reading a client file lock description file and writing the client file lock description file to a first predetermined data-store (i.e. it performs a "copy"). According to one example embodiment, the first predetermined data-store comprises computer readable medium 405 onto which the client file lock description file is recorded once it is read by the file migration instruction sequence 370. According to yet another alternative example embodiment, the file migration instruction sequence 370 minimally causes the processor to record a file lock indicator by reading a client file lock description file, creating a client file lock record according to the client file lock description file and storing the newly created client file lock record in a first predetermined data-store. The file migration instruction sequence 370, according to one alternative embodiment, uses the operating system and its drivers 400 to access the computer readable medium 405 by means of the computer readable medium interface 410 enabling it to use the computer readable medium 405 as the first predetermined data-store.

According to one alternative embodiment, the file lock migration process 370 minimally causes the processor to convey a file lock indicator to a second predetermined data-store by causing the processor to place a client file lock indicator into a file lock data-store on the adoptive server 380. According to one alternative embodiment, the file lock migration process 370 accomplishes this by minimally causing the processor to copy a client file lock description file from the first predetermined data-store to a network file system status monitor directory. According to yet another alternative embodiment, the file lock migration process 370 causes the processor to convey a file lock indicator to a second predetermined data-store by minimally causing the processor to retrieve a client file lock record from the first predetermined data-store, create a client file lock description file according to the client file lock record and store the newly created client file lock description file in a network file system status monitor directory (e.g. a directory on the adoptive server).

According to yet another alternative embodiment, the file lock migration process 370 minimally causes the processor, through the use of the computer readable medium interface 410 controlled by the operating system and its drivers 400, to access the computer readable medium 405. For example, the file lock migration process 370, according to one alternative embodiment, minimally causes the processor to access a partition on the computer readable medium 405 that is managed by the adoptive server 380. Hence, the network file system status monitor directory into which the file lock migration process 370 stores a client file lock indicator (e.g. a client file lock description file) resides on this partition of the computer readable medium 405 that is managed by the adoptive server 380.

In order to ascertain the health of the primary server, one example embodiment further comprises a health monitor 460 that executes on the primary server 415. When the health monitor 460 ascertains that the primary server 415 is unhealthy, it stops sending health messages to the file lock migration process 370 executing on the adoptive server 380. When the file lock migration process 370 perceives a lack of health messages that would otherwise arrive from a healthy primary server 415, the file lock migration process 370 conveys a client file lock indicator to the second predetermined data-store.

Once a client file lock indicator is conveyed to the second predetermined data-store (e.g. to the adoptive server 380), a network file system 500 executing on the adoptive server 380 is commanded to recognize the conveyed (i.e. migrated) client file lock indicator. Accordingly, one alternative embodiment of a file lock migration process 370 further comprises a restart process 505 that minimally causes the processor to cause the adoptive server to recognize a migrated file lock. The restart process 505, according to one variation of the present method, accomplishes this by minimally causing the processor to dispatch a command to the network file system 500 executing on the adoptive server 380. The restart process 505 minimally causes the processor to dispatch at least one of a network file system restart command, a network file system lock manager/lock lock status monitor restart command and a network file system file lock recovery sequence trigger command. These are just some examples of commands recognized by a network file system that results in recognition of a migrated client file lock. The scope of the claims appended hereto is not intended to be limited to this brief list of example commands, but rather is intended to include all commands that result in recognition of a migrated client file lock by the network file system 500 executing on an adoptive server 380. Once a migrated client file lock is recognized by the network file system 500 executing on an adoptive server 380, the lock manager 510 will attempt to reestablish (or confirm) that file lock with a particular client. According to one embodiment, this is accomplished by allowing a client to reclaim its file lock.

The functional processes (and their corresponding instruction sequences) described thus far that enable migration of a file lock from one server to another are, according to one embodiment, imparted onto computer readable medium. Examples of such media include, but are not limited to, random access memory, read-only memory (ROM), CD ROM, floppy disks, and magnetic tape. This computer readable media, which alone or in combination can constitute a stand-alone product, can be used to convert a general-purpose computing platform into a device for migrating file locks from one server to another according to the techniques and teachings presented herein. Accordingly, the claims appended hereto are to include such computer readable medium imparted with such instruction sequences that enable execution of the present method and all of the teachings afore described.

ALTERNATIVE EMBODIMENTS

While this invention has been described in terms of several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

In the interest of clarity, the method for migrating file locks from one server to another has thus far been described in terms where a primary server is unhealthy. It is not intended that the present method, apparatus, software and computer readable medium be limited to application where a primary server is to become unhealthy. For example, the present method for migrating a file lock may be utilized whenever a network file system function is migrated from one server to another. This can occur when the primary server is unhealthy, is overloaded in terms of processing capacity, upon specific direction by manual or automatic process to migrate NFS functions from one server to another and for any other reason. Hence, the scope of the appended claims is to include all such permutations where a primary server is "unavailable".

What is claimed is:

1. A method for migrating file locks from one server to another comprising:
    receiving a file lock indicator from a primary server, the file lock indicator representative of a granted file lock;
    recording the file lock indicator; and
    dynamically conveying the file lock indicator to an adoptive server when the primary server is unavailable, the adoptive server configured to use the file lock indicator to honor a request for access to data corresponding to the granted file lock.

2. The method of claim 1 wherein receiving a file lock indicator comprises:
    monitoring a file lock data-store on a primary server; and
    retrieving a client file lock indicator from the file lock data-store when a new client file lock indicator is detected in the file lock data-store.

3. The method of claim 2 wherein monitoring a file lock data-store comprises monitoring a network file system status monitor directory.

4. The method of claim 1 wherein recording the file lock indicator comprises copying a client file lock description file to a predetermined data-store.

5. The method of claim 1 wherein recording the file lock indicator comprises creating a file lock record according to a client file lock description file.

6. The method of claim 1 wherein conveying the file lock indicator to an adoptive server comprises placing a client file lock indicator in a file lock data-store on an adoptive server.

7. The method of claim 6 wherein placing a client file lock indicator in a file lock data-store comprises copying a client file lock description file from a predetermined data-store to a network file system status monitor directory on an adoptive server.

8. The method of claim 6 wherein placing a client file lock indicator in a file lock data-store comprises:
    retrieving a file lock record;
    creating a client file lock description file according to the file lock record; and
    storing the client file lock description file in a network file system status monitor
    directory on an adoptive server.

9. The method of claim 1 further comprising forcing the adoptive server to recognize the conveyed file lock indicator.

10. The method of claim 9 wherein forcing the adoptive server to recognize the conveyed file lock indicator comprises at least one of restarting a network file system, restarting a network file system file lock manager and its associated file lock monitor and triggering a file lock recovery sequence.

11. A file lock migration unit comprising:
data storage unit; and
file lock monitor comprising:
file lock receiver capable of receiving a file lock indicator from a primary server and storing said file lock indicator in the data storage unit, the file lock indicator representative of a granted file lock; and
file lock conveyance unit capable of dynamically conveying the file lock indicator from the data storage unit to an adoptive server when the primary server is unavailable, the adoptive server configured to use the file lock indicator to honor a request for access to data corresponding to the granted file lock.

12. The file lock migration unit of claim 11 wherein the file lock receiver comprises:
detector capable of monitoring a file lock data-store on a primary server; and
retrieval unit capable of retrieving a client file lock indicator from the file lock data-store on the primary server when a new client file lock indicator is detected in the file lock data store on the primary server.

13. The file lock migration unit of claim 12 wherein the detector monitors a network file system status monitor directory.

14. The file lock migration unit of claim 11 wherein the file lock receiver comprises a retrieval unit capable of copying a client file lock description file to the data storage unit.

15. The file lock migration unit of claim 11 wherein the file lock receiver comprises a retrieval unit capable of reading a client file lock description file and generating a file lock record according to the client file lock description file.

16. The file lock migration unit of claim 11 wherein the file lock conveyance unit places a client file lock indicator in a file lock data-store on an adoptive server.

17. The file lock migration unit of claim 11 wherein the file lock conveyance unit copies a client file lock description file from the data storage unit to a file lock data-store on an adoptive server.

18. The file lock migration unit of claim 11 wherein the file lock conveyance unit generates a client file lock description file according to a file lock record retrieved from the data storage unit and places the client file lock description file in a file lock data-store on an adoptive server.

19. The file lock migration unit of claim 11 further comprising a restart unit capable of forcing the adoptive server to recognize a conveyed file lock indicator.

20. The file lock migration unit of claim 19 wherein the restart unit is capable of sending to the adoptive server at least one of a network file system restart command, a network file system lock management and lock status restart command and a network file system file lock recovery sequence trigger command.

21. A file lock migration system comprising:
processor capable of executing instructions; and
file migration instruction sequence, that when executed by the processor, minimally causes the processor to:
receive a file lock indicator from a primary server, the file lock indicator representative of a granted file lock;
record the file lock indicator in a first predetermined data-store; and
dynamically convey the file lock indicator to a second predetermined data-store when the primary server is unavailable, the file lock indicator accessed from the second predetermined data-store to honor a request for access to data corresponding to the granted file lock.

22. The file lock migration system of claim 21 wherein the file migration instruction sequence comprises a file lock receiver instruction sequence that, when executed by the processor, minimally causes the processor to:
monitor a file lock data-store on a primary server; and
retrieve a client file lock indicator when a new client file lock indicator is detected in the file lock data-store on the primary server.

23. The file lock migration system of claim 22 wherein the file lock receiver instruction sequence causes the processor to monitor a file lock data store on a primary server by minimally causing the processor to monitor a network file system status monitor directory.

24. The file lock migration system of claim 21 wherein the file migration instruction sequence causes the processor to record the file lock indicator by minimally causing the processor to:
read a client file lock description file; and
write the client file lock description file to a first predetermined data-store.

25. The file lock migration system of claim 21 wherein the file migration instruction sequence causes the processor to record the file lock indicator by minimally causing the processor to:
read a client file lock description file;
create a client file lock record according to the client file lock description file; and
write the client file lock record to a first predetermined data-store.

26. The file lock migration system of claim 21 wherein the file migration instruction sequence causes the processor to convey the file lock indicator to a second pre-determined data-store by minimally causing the processor to place a client file lock indicator in a file lock data-store on an adoptive server.

27. The file lock migration system of claim 21 wherein the file migration instruction sequence causes the processor to convey the file lock indicator to a second predetermined data-store by minimally causing the processor to copy a client file lock description file from the first predetermined data-store to a network file system status monitor directory.

28. The file lock migration system of claim 21 wherein the file migration instruction sequence causes the processor to convey the file lock indicator to a second predetermined data-store by minimally causing the processor to:
retrieve a client file lock record from the first predetermined data-store;
create a client file lock description file according to the client file lock record; and
store the created client file lock description file in a network file system status monitor directory.

29. The file lock migration system of claim 21 wherein the file migration instruction sequence further comprises a restart instruction sequence that, when executed by the processor, minimally causes the processor to force a network file system to recognize a conveyed file lock indicator.

30. The file lock migration system of claim 21 wherein the file migration instruction sequence further comprises a restart instruction sequence that, when executed by the processor, minimally causes the processor to dispatch to a network file system process at least one of a network file system restart command, a network file system lock manager and lock status monitor restart command and a network file system file lock recovery sequence trigger command.

31. A computer-readable storage medium having computer-executable functions for migrating file locks from one server to another comprising:

file migration instruction sequence, that when executed by a processor, minimally causes the processor to:
  receive a file lock indicator from a primary server, the file lock indicator representative of a granted file lock;
  record the file lock indicator in a first predetermined data-store; and
  dynamically convey the file lock indicator to a second predetermined data-store when the primary server is unavailable, the file lock indicator accessed from the second predetermined data-store to honor a request for access to data corresponding to the granted file lock.

32. The computer readable storage medium of claim 31 wherein the file migration instruction sequence comprises a file lock receiver instruction sequence that, when executed by a processor, minimally causes the processor to:
  monitor a file lock data-store on a primary server; and
  retrieve a client file lock indicator when a new client file lock indicator is detected in the file lock data-store on the primary server.

33. The computer readable storage medium of claim 32 wherein the file lock receiver instruction sequence causes a processor to monitor a file lock data store on a primary server by minimally causing the processor to monitor a network file system status monitor directory.

34. The computer readable storage medium of claim 31 wherein the file migration instruction sequence causes the processor to record the file lock indicator by minimally causing the processor to:
  read a client file lock description file; and
  write the client file lock description file to a first predetermined data-store.

35. The computer readable storage medium of claim 31 wherein the file migration instruction sequence causes a processor to record the file lock indicator by minimally causing the processor to:
  read a client file lock description file;
  create a client file lock record according to the client file lock description file; and
  write the client file lock record to a first predetermined data-store.

36. The computer readable storage medium of claim 31 wherein the file migration instruction sequence causes the processor to convey the file lock indicator to a second predetermined data-store by minimally causing the processor to place a client file lock indicator in a file lock data-store on an adoptive server.

37. The computer readable storage medium of claim 31 wherein the file migration instruction sequence causes the processor to convey the file lock indicator to a second predetermined data-store by minimally causing the processor to copy a client file lock description file from the first predetermined data-store to a network file system status monitor directory.

38. The computer readable storage medium of claim 31 wherein the file migration instruction sequence causes the processor to convey the file lock indicator to a second predetermined data-store by minimally causing the processor to:
  retrieve a client file lock record from the first predetermined data-store;
  create a client file lock description file according to the client file lock record; and
  store the created client file lock description file in a network file system status monitor directory.

39. The computer readable storage medium of claim 31 wherein the file migration instruction sequence further comprises a restart instruction sequence that, when executed by the processor, minimally causes the processor to force a network file system to recognize a conveyed file lock indicator.

40. The computer readable storage medium of claim 31 wherein the file migration instruction sequence further comprises a restart instruction sequence that, when executed by the processor, minimally causes the processor to dispatch to a network file system process at least one of a network file system restart command, a network file system lock manager and lock status monitor restart command and a network file system file lock recovery sequence trigger command.

41. An apparatus for migrating file locks from one server to another comprising:
  means for receiving a file lock indicator from a primary server, the file lock indicator representative of a granted file lock;
  means for recording the file lock indicator; and
  means for dynamically conveying the file lock indicator to an adoptive server when the primary server is unavailable, the adoptive server configured to use the file lock indicator to honor a request for access to data corresponding to the granted file lock.

42. The apparatus of claim 41 wherein the means for receiving a file lock indicator comprises:
  means for monitoring a file lock data-store on a primary server; and
  means for retrieving a client file lock indicator from the file lock data-store when a new client file lock indicator is detected in the file lock data-store.

43. The apparatus of claim 42 wherein the means for monitoring a file lock data-store comprises a means for monitoring a network file system status monitor directory.

44. The apparatus of claim 41 wherein the means for recording the file lock indicator comprises a means for copying a client file lock description file to a predetermined data-store.

45. The apparatus of claim 41 wherein the means for recording the file lock indicator comprises a means for creating a client file lock record according to a client file lock description file.

46. The apparatus of claim 41 wherein the means for conveying the file lock indicator to an adoptive server comprises a means for placing a client file lock indicator in a file lock data store on an adoptive server.

47. The apparatus of claim 41 wherein the means for conveying the file lock indicator to an adoptive server comprises a means for copying a client file lock description file from a predetermine data-store to a network file system status monitor directory on an adoptive server.

48. The apparatus of claim 41 wherein the means for conveying the file lock indicator to an adoptive server comprises:
  means for retrieving a file lock record;
  creating a client file lock description file; and
  storing the created client file lock description file in a network file system status monitor directory on an adoptive server.

* * * * *

UNITED STATES PATENT AND TRADEMARK OFFICE
CERTIFICATE OF CORRECTION

PATENT NO. : 7,143,097 B1
APPLICATION NO. : 10/632233
DATED : November 28, 2006
INVENTOR(S) : David F. Olker et al.

It is certified that error appears in the above-identified patent and that said Letters Patent is hereby corrected as shown below:

In column 3, lines 55-56, delete "Ivar/statmon/sm" and insert -- /var/statmon/sm --, therefor.

In column 4, line 17, delete "Ivar/statmon/sm" and insert -- /var/statmon/sm --, therefor.

In column 5, line 66, delete "Ivar/statmon/sm" and insert -- /var/statmon/sm --, therefor.

In column 9, line 26, after "manager/lock" delete "lock".

Signed and Sealed this

Twenty-eighth Day of July, 2009

JOHN DOLL
*Acting Director of the United States Patent and Trademark Office*